United States Patent
Jurisch et al.

(10) Patent No.: US 7,456,826 B2
(45) Date of Patent: Nov. 25, 2008

(54) TOUCHSCREEN-SENSITIVE AND TRANSPONDER READING STYLUS

(76) Inventors: Reinhard Jurisch, Ueber den Krautlaendern 61, Erfurt-Urbich (DE) 99189; Peter Peitsch, Damaschkestr. 10, Erfurt (DE) 99096; Sylvo Jaeger, Am Bach 7, Erfurt-Linderbach (DE) 99189

( * ) Notice: Subject to any disclaimer, the term of this patent is extended or adjusted under 35 U.S.C. 154(b) by 217 days.

(21) Appl. No.: 10/506,171

(22) PCT Filed: Feb. 27, 2003

(86) PCT No.: PCT/DE03/00683

§ 371 (c)(1),
(2), (4) Date: Aug. 30, 2004

(87) PCT Pub. No.: WO03/073368

PCT Pub. Date: Sep. 4, 2003

(65) Prior Publication Data

US 2005/0104870 A1    May 19, 2005

(30) Foreign Application Priority Data

Feb. 28, 2002   (DE) ................. 102 08 939
Mar. 26, 2002   (DE) ................. 102 14 050

(51) Int. Cl.
   *G06F 3/033*    (2006.01)
(52) U.S. Cl. ...................... 345/179; 382/188
(58) Field of Classification Search ................. 382/188; 345/179–183
See application file for complete search history.

(56) References Cited

U.S. PATENT DOCUMENTS

| | | | |
|---|---|---|---|
| 5,308,967 A | 5/1994 | Jurisch | |
| 5,369,262 A | 11/1994 | Goldner et al. | |
| 5,519,729 A | 5/1996 | Peitsch et al. | |
| 5,913,629 A | 6/1999 | Hazzard | |
| 5,939,702 A | 8/1999 | Vernon et al. | |
| 6,050,735 A | 4/2000 | Hazzard | |
| 6,246,393 B1* | 6/2001 | Watanabe et al. | 345/173 |
| 6,724,374 B1* | 4/2004 | Lapstun et al. | 345/179 |
| 2002/0047833 A1* | 4/2002 | Kitada et al. | 345/173 |
| 2002/0113778 A1* | 8/2002 | Rekimoto et al. | 345/173 |
| 2003/0107558 A1* | 6/2003 | Bryborn et al. | 345/179 |
| 2004/0061690 A1* | 4/2004 | Braun et al. | 345/179 |

* cited by examiner

*Primary Examiner*—Amr Awad
*Assistant Examiner*—Michael Pervan
(74) *Attorney, Agent, or Firm*—Jordan and Hamburg LLP

(57) ABSTRACT

The invention relates to a touchscreen-sensitive and transponder reading stylus. The object of the invention is to provide a small touchscreen-sensitive stylus whose power requirements are low and which allows transponder communication. The inventive stylus is characterized in that a hand-piece also accommodates an RF-ID electronic system and that it comprises a tip range that tapers in at least one direction of its scanning tip. Said tip area is provided with an antenna preferably in the form of an electric coil and is configured in such a manner that it is devoid of an electromagnetic screening, that an electromagnetic field emitted at the tapered end is substantially not attenuated and that it is suitable for the optically exact scanning of screens.

16 Claims, 8 Drawing Sheets a)

b)

TOUCHSCREEN-SENSITIVE AND TRANSPONDER READING STYLUS

BACKGROUND OF THE INVENTION

Figure 1:
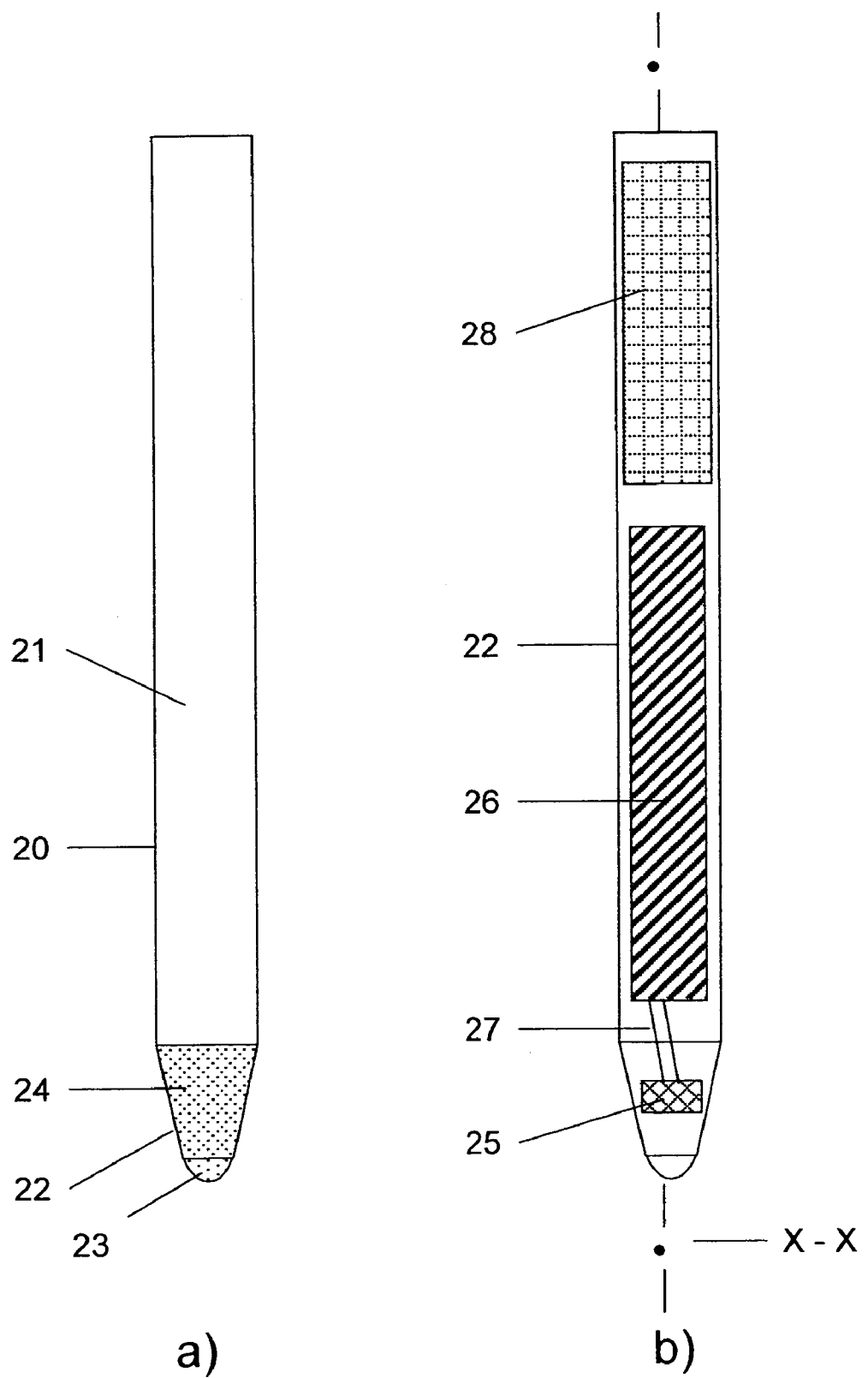

The invention relates to a touchscreen sensing and transponder reading stylus according to the kind of the patent claims.

It is generally known to use so-called pens for working with sensitive-to-touch screens (touch screens) of computers or personal digital assistants (PDAs, for example, pens for PSION, series 5). These generally have sensing tips of rounded design in order to avoid damaging the very sensitive surfaces of the screens. Furthermore, there are laser-pens known for scanning bar codes or for the automatic detection of characters.

Write devices are known from U.S. Pat. No. 5,913,629 and U.S. Pat. No. 6,050,735 which are suited for use as styluses on screens.

Furthermore, there are known transponder-write-and-read devices for communicating with transponders via an inductive coupling or radio frequencies coupling (refer to Technical information of the enterprise MICRO-SENSYS ltd. concerning the RF-Identification System iID-2000). Due to the antenna design employed up-to-now with these devices they, however, are not suited for use on touchscreens.

SUMMARY OF THE INVENTION

Therefore, it is an object of the present invention to provide a touchscreen-sensitive stylus whose power requirements is low and which simultaneously or sequentially allows for communication with transponders as well with computer devices or telephones.

The object is realized by the features of the first Patent claim. Advantageous embodiments are covered by the dependent claims.

Thereby, there can be a connection by wire as well as a wireless connection, unidirectional or bi-directional, between the stylus with its optical sensing and the computer and/or the control unit and/or the transponder. The antenna for the RF-ID (Radio Frequency Identification)-electronics is preferably but not necessarily designed as a coil. This at least one antenna is preferably arranged in the tip range of and for a compactly designed and easily to handle touchscreen and transponder reading stylus, resulting in the electromagnetic field being advantageously emitted from the tapering end of the tip range of the hand-piece. In this case the preferably cylindrical range of the hand-piece is made of a suitable metal and its tip range is made of a suitable synthetical material. Furthermore, the stylus is not restricted to a definite shape: provided that it seems to be ergonomically favorable or trendy the stylus maybe at least partially designed as a sphere, a cone, a cuboid or a pyramid.

The advantages of the present invention consist in a small and compact design similar to a ball-pen which permits a universal application. When using PDAs the user must not use two separate devices as common according to the prior art, such as touch-pens and or read-pens. Furthermore, the invention enables to provide for an energy-saving stylus what in particular is of importance when battery operated devices are concerned.

DETAILED DESCRIPTION OF THE INVENTION

Figure 3:
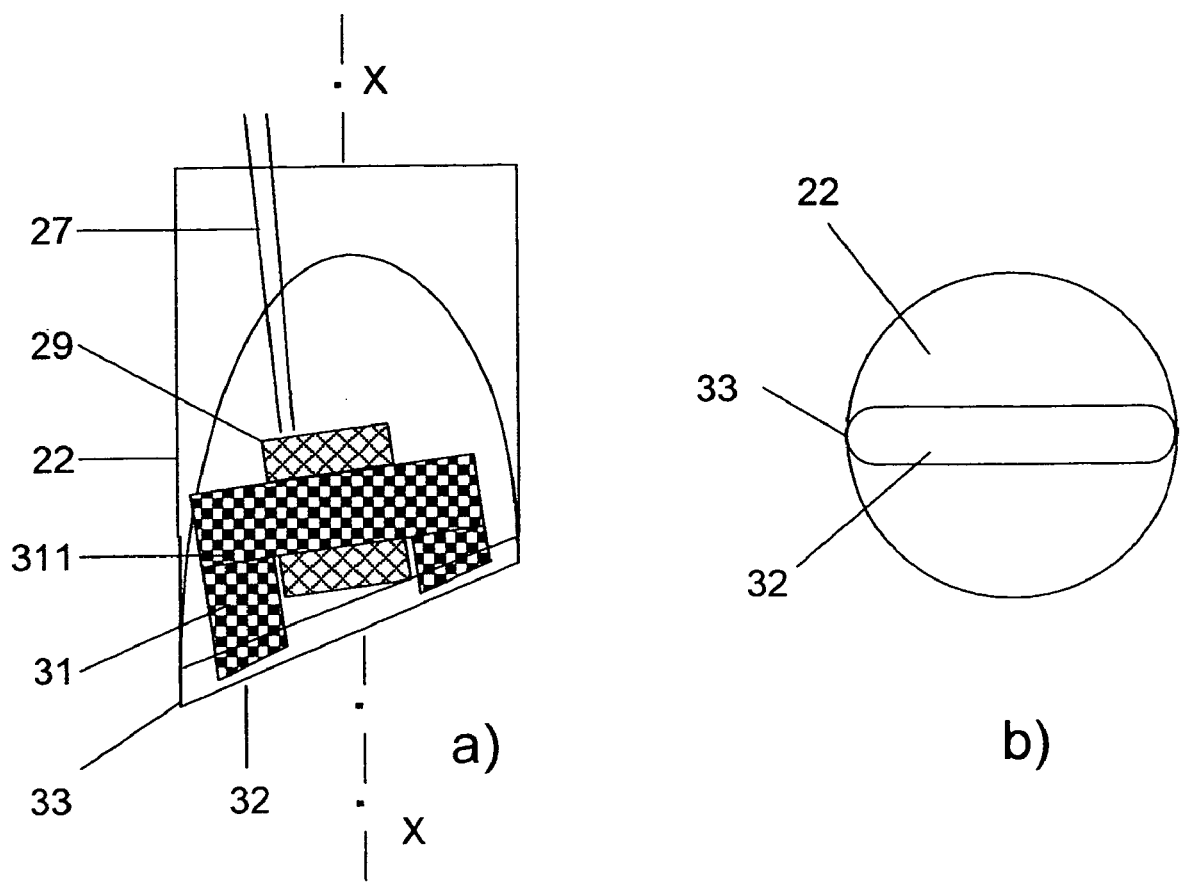
Figure 2:
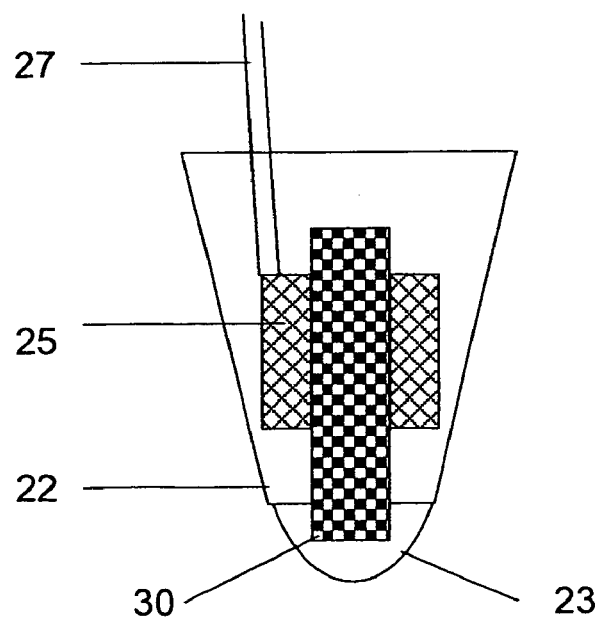
Figure 4:
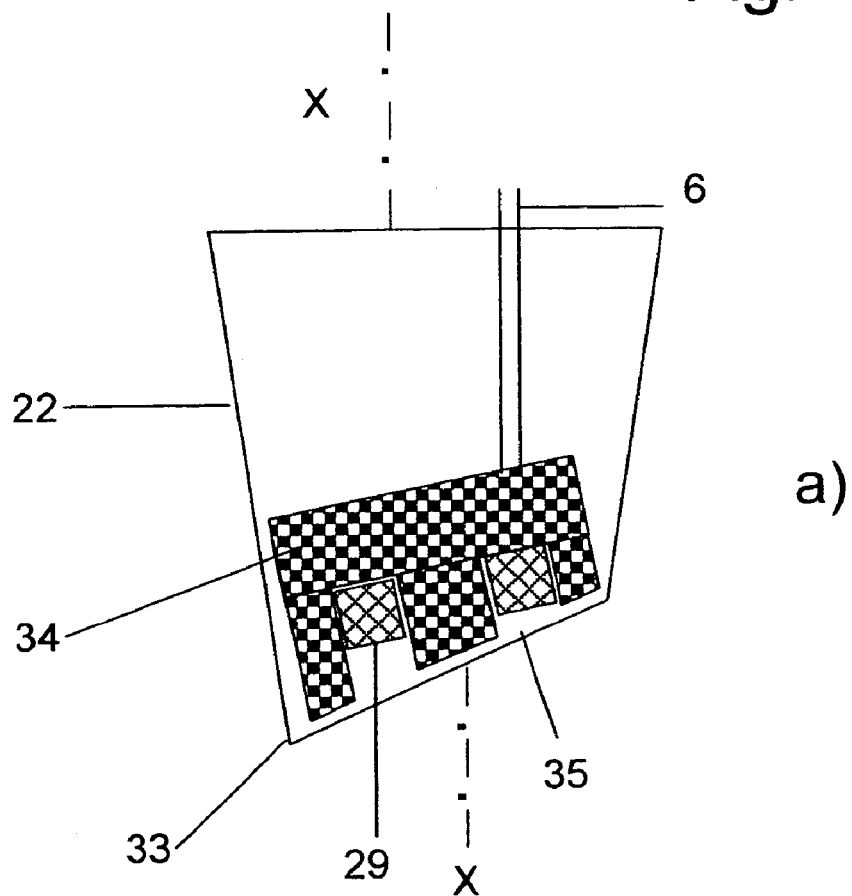
Figure 4:
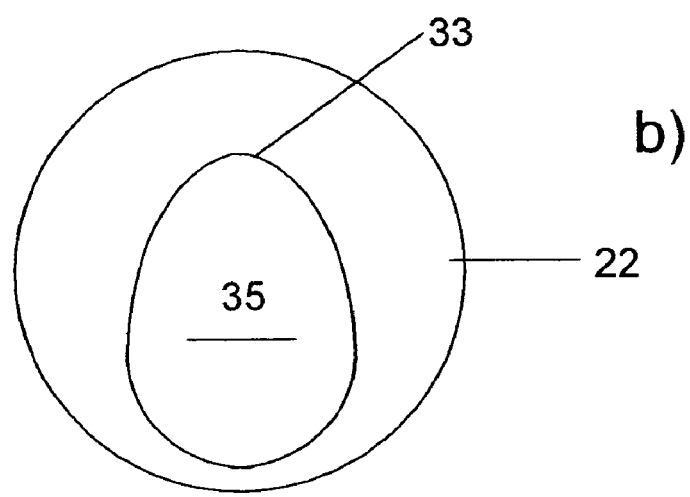
Figure 5:
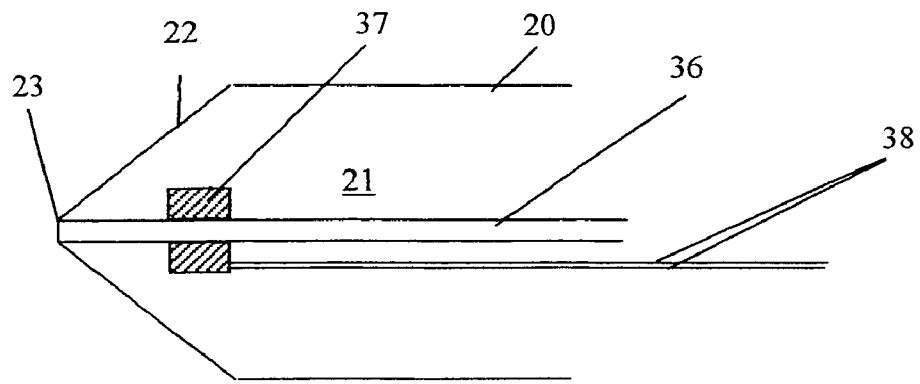
Figure 6:
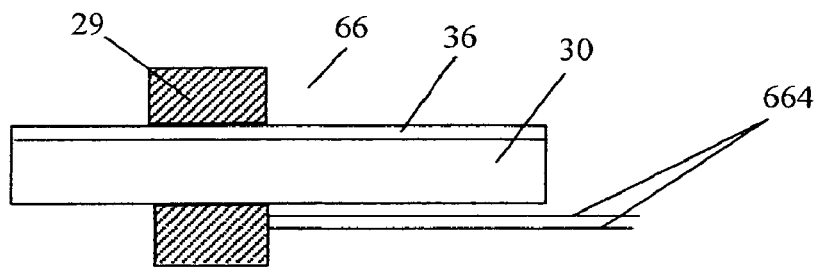
Figure 7:
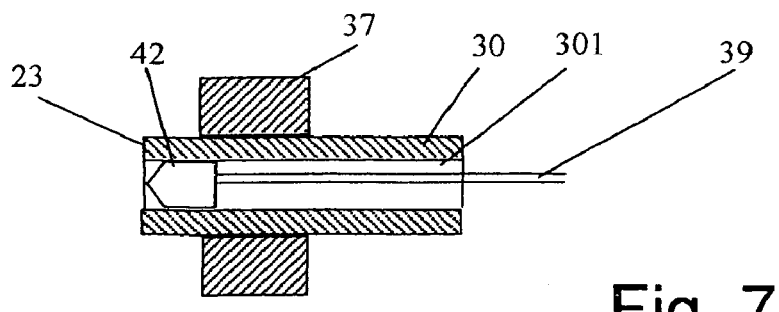
Figure 8:
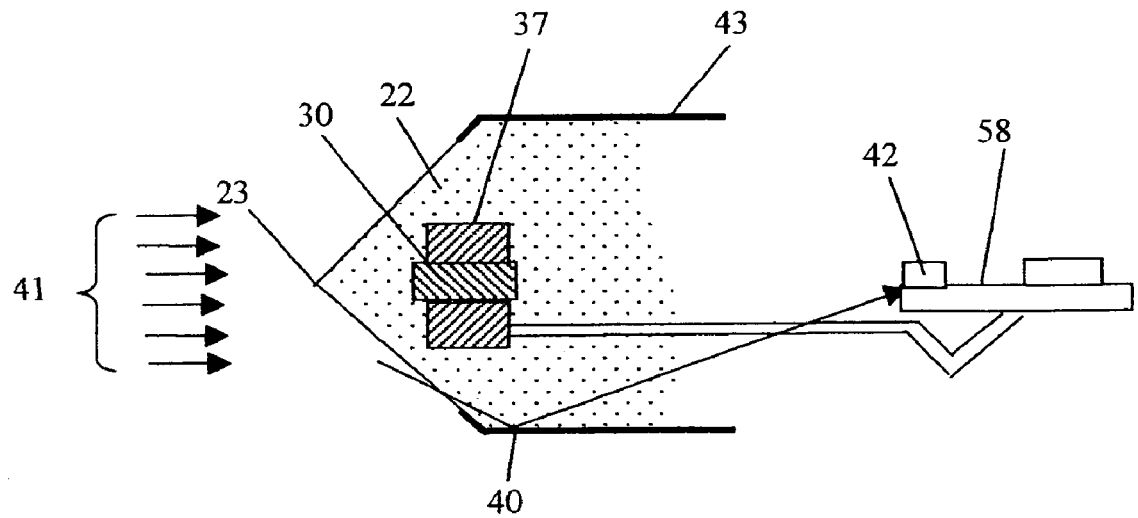
Figure 9:
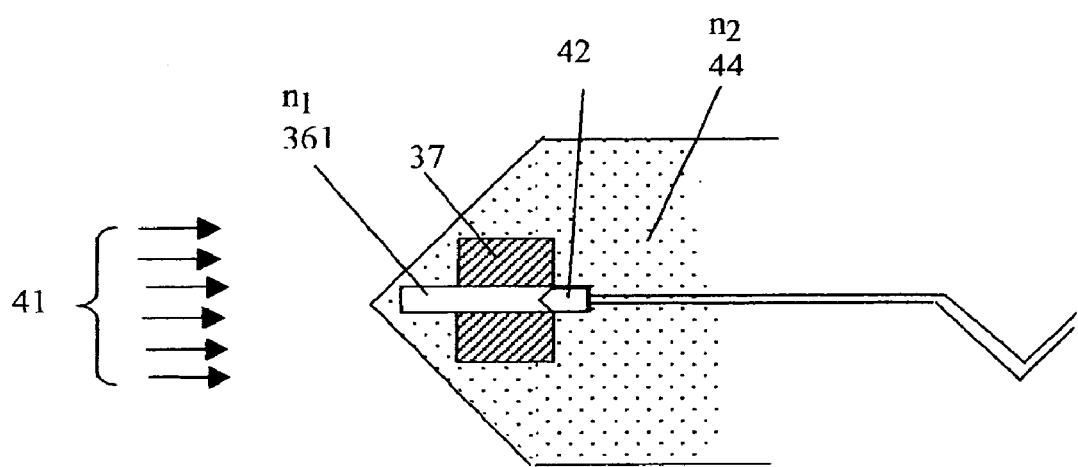
Figure 10:
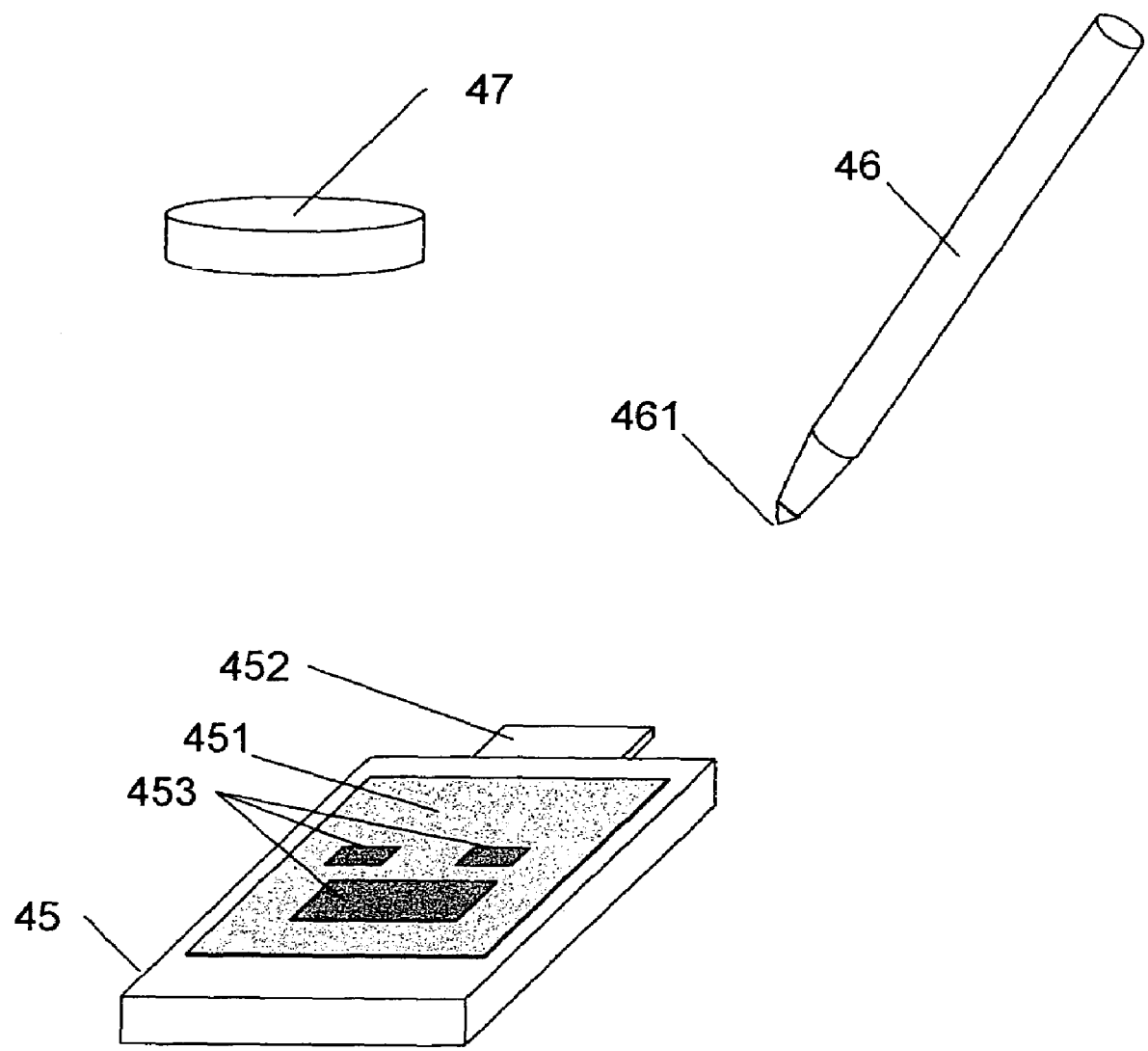
Figure 11:
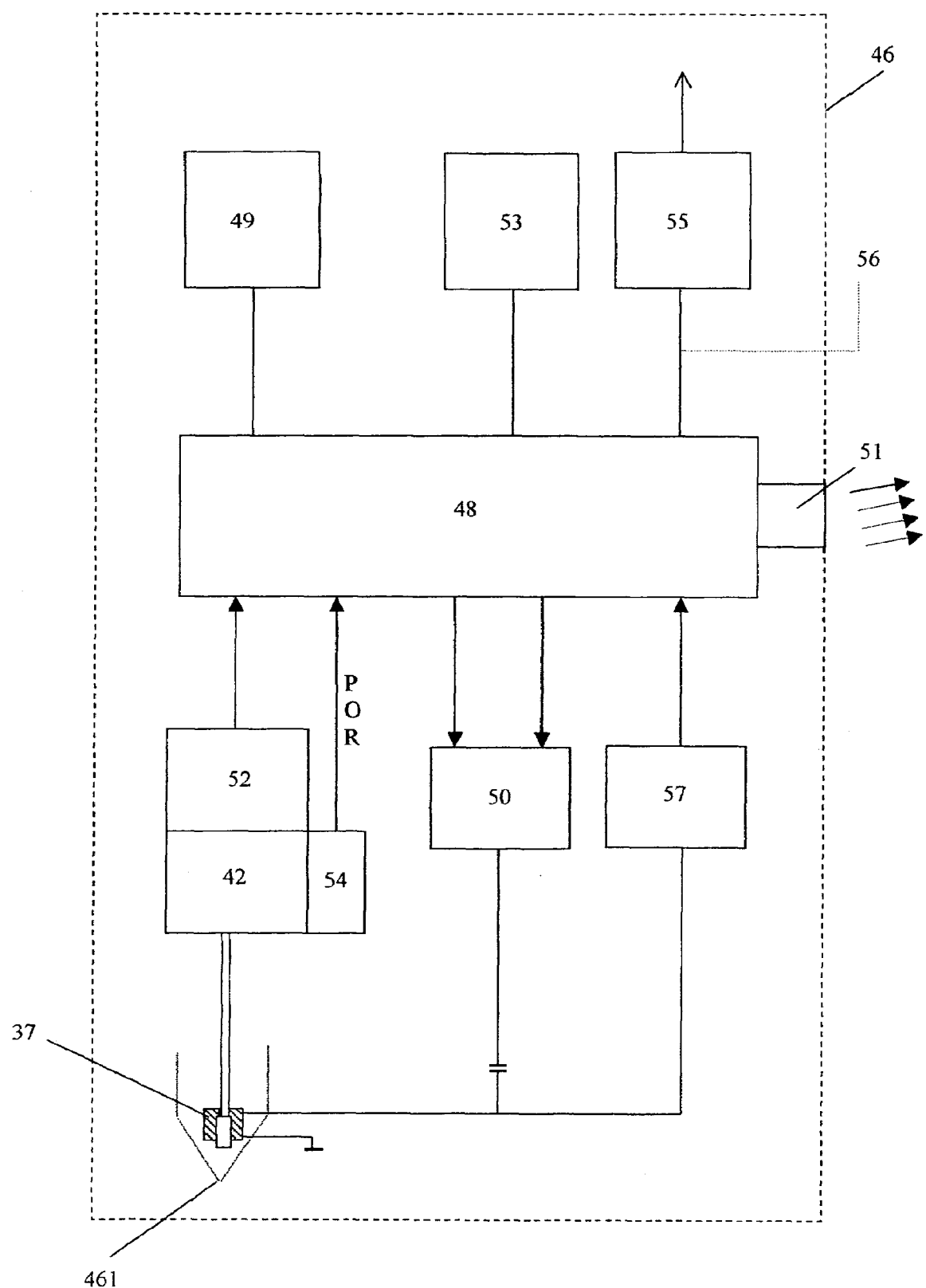
Figure 12:
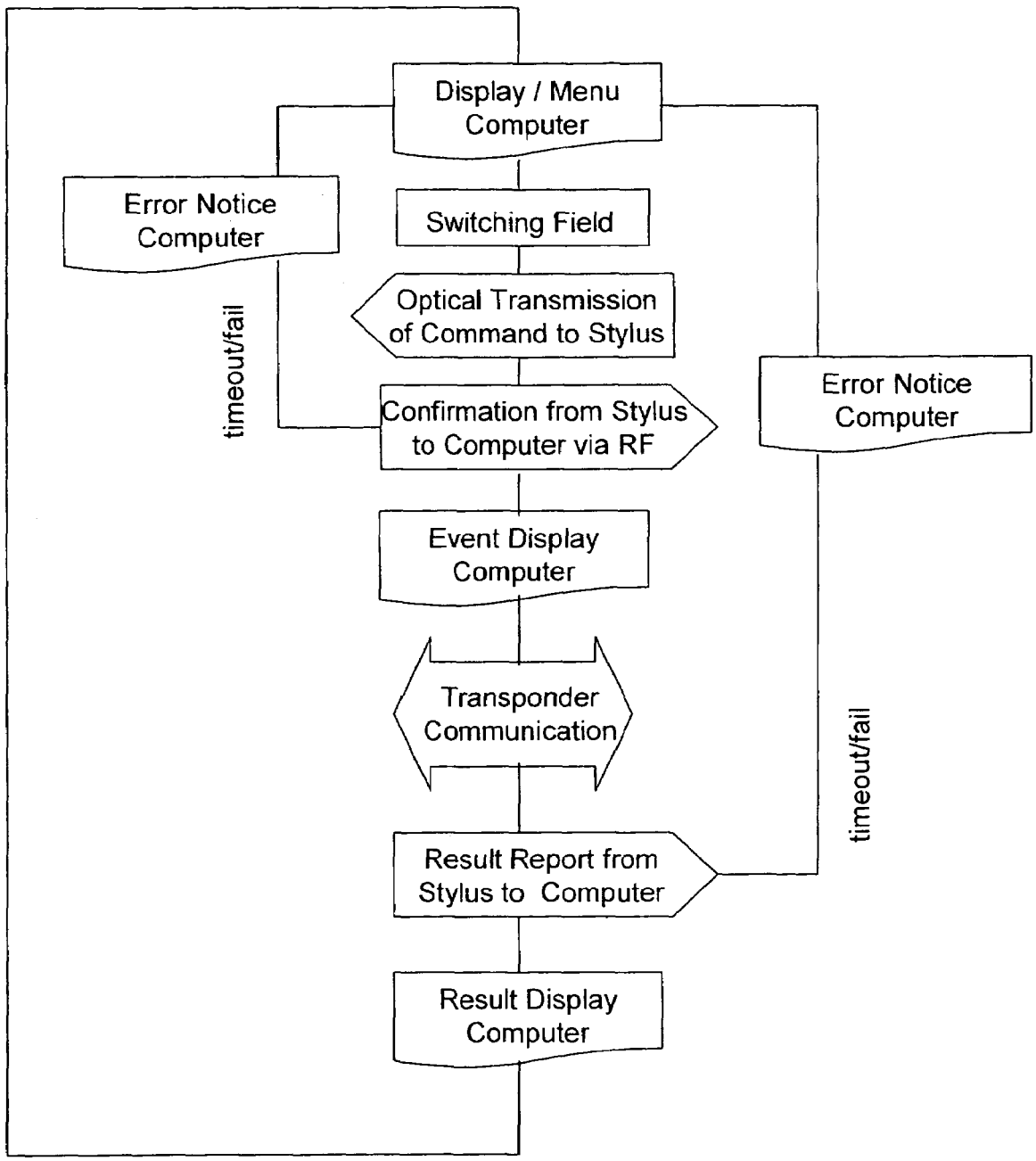

The invention will be explained in more detail by virtue of the schematical drawings, in which:

FIG. 1 is an inventional touchscreen sensing and transponder reading stylus a) in a schematic view and b) in a longitudinal sectional view, FIG. 2 is a first embodiment of the tip of the stylus in addition to a first write/read antenna, FIG. 3 is a second embodiment of the tip of the stylus in addition to an embodiment of a second write/read antenna a) in a sectional view and b) in a schematical view, FIG. 4 is a third embodiment of the tip of the stylus in addition to the embodiment of a third write/read antenna a) in a sectional view and b) in a bottom schematical view, FIG. 5 is a fourth embodiment of the tip of the stylus in a sectional view, FIG. 6 is a setup in detail according to FIG. 5 in an axial sectional view, FIG. 7 is a fifth detailed embodiment of the tip of the stylus in an axial sectional view, FIG. 8 is a sixth embodiment of the tip of the stylus in an axial sectional view, FIG. 9 is a seventh embodiment of the scanning tip of the stylus in an axial sectional view, FIG. 10 is a stylus interacting with a computer screen and a transponder, FIG. 11 is a block scheme of all relevant components housed within the stylus, and FIG. 12 is a scheme of function for the use of a stylus according to the invention.

In FIG. 1 and inventional touchscreen-sensitive and transponder reading stylus 20 comprises a hand-piece 21 in which a preferably cylindrical portion is followed by a tip range 22 which, being particularly conical or pyramidal, tapers towards a round scanning tip 23. The tip range 22 is configured such to allow for accommodating differently designed antenna 25 in its specially shaped range 24. The scanning tip 23 is adapted to touch touchscreens not shown here. Alternatively, both ranges 23 and 24 can merge into each other. The antennae 25 are preferably realized by electrical coils which emit a magnetic field. Furthermore, the stylus 20 includes a write/read electronics 26, described in FIG. 11, the write/read electronics 26 is connected to the antenna 25 via coil wires 27. Furthermore, the stylus 20 comprises possible additional components 28 such as batteries, connectors or cables, radio data modules etc. which are known at least partially.

Since the special embodiment and the geometry of the tip and the antenna are important, the following will at first deal therewith.

FIG. 2 illustrates an embodiment of the tip range 22 in axial symmetry in addition to a write/read antenna configured as a coil 29, which is connected via wires 27 to the electronics 26. In this example, a ferro-magnetic rod-shaped core 30 is used about which a coil 29 is wrapped, wherein the tip range 22 is designed axially symmetrically tapering and the scanning tip 23 is rounded.

When there is sufficient coupling between the antenna 25 and a transponder illustrated in FIG. 10, the core 30 can in special cases and possibly be omitted. This applies also for the following examples, however, must not be considered as a preferred embodiment.

FIG. 3 illustrates a second embodiment of a tip range 22 together with the embodiment of a second write/read antenna 29 having a U-shaped core 31, the antenna 29 being particularly suited for glass-transponder and transponders with pot core. Thereby the scanning tip has a longitudinally extending rounded edge 32, as the oval shape of the front view of the tip range 22 in FIG. 3b shows. As concerns the ferro-magnetic U-shaped core 31, the coil 29 is wrapped around the core range 311 which connects at right angles the two legs being parallel to each other, whereby the tip range 22 is on both sides in one dimension tapering and the rounded edge 32 is slantingly arranged. The proper scanning tip of the tip range 22 is at 33 where the oval 32 of the rounded edge has its smallest radius of curvature.

When the edge 32, differing from FIG. 3, is directed at right angles to the geometrical axis X-X of the stylus 20 and the tip range 22, respectively, the oval range of the rounded edge 32 has two equal ranges of smallest radius of curvature.

According to FIG. 4, there is a pot core 34 in the tip range 22 into which the coil 29 is inserted, whereby the tip range 22 extends tapering and off-center to the geometrical axis X-X and is provided with a slant in the scanning tip 23. Thus an elliptical slanting area 35 results. Hence, the tip range offers space for the a-symmetrical pot-core 34 and achieves a punctual geometry. The proper scanning tip lies at 33 where the boundary line of the slanting area 35 has its smallest radius of curvature. The scanning tips of FIGS. 3 and 4 are optimally used in the course of scanning the touchscreens in a vertical position and, when used on transponders, at an inclination of 10° to 45° relative to an object in which or upon which the transponder is arranged.

With all the embodiments described above the maximal diameter of the tip range 22 at the hand-piece should not exceed about 15 mm. Furthermore, in the embodiments of FIGS. 3 and 4, the slanting surfaces 32 and 35, respectively, in the range 33 of the smallest radius of curvature can also be designed rounded.

The shape of the scanning tip is designed in each of the embodiments such, that the size of the tip is adapted to uniquely touch the smallest possible touch field on a touchscreen and that a sufficiently wide distance between the transponder and the antenna is ensured. The touch field shall be smaller than 1 mm$^2$ to minimally limit the visible range for the user when it is used as a stylus or as a transponder reading stylus for small transponders. An ergonomical handling of the stylus at a possibly wide communication distance between the stylus and transponder is ensured. The tip range is preferably made of a synthetic material and there is no magnetic flux obstructing medium provided in front of the scanning tip so that there is no magnetic screening and no substantial attenuation of the magnetic field.

In order to activate a write/read-electronics and, if required, for data transfer, the inventional touchscreen-sensitive and transponder reading stylus is provided with an opto-electric sensor.

In FIG. 5 there again is provided a stylus 20 having a hand-piece 21 and a tip range 22, in which a light guide in the form of a light conducting cable 36 extending up to the scanning tip 23 establishes the optical connection to an optical sensor (light sensor, see FIG. 8) which is part of a write/read electronics such as represented, for example, in FIG. 11. Thereby a not shown lens for light collecting and imaging, respectively, can be pre-positioned to the light conducting cable 36. An antenna 37 including electrical connections 38 is provided around the light conducting cable in the range of the tip 22, said electrical connections 38 lead to a not shown printed circuit board provided in the stylus 20. The advantage of an opto-electronical activation consists in that a switch-on operation of the energy-consuming electronics can be carried out without energy consumption or with only a very low energy consumption.

In FIG. 6 an antenna designed as a coil 29 is wrapped upon a ferrite core 30 upon which also a light guide 36 is arranged. The remaining components of the tip range are omitted in the representation for the sake of simplicity. The light guide 36 can also be inserted into a respective recess or groove at the ferrite core.

In FIG. 7 a ferrite core 30 is provided around which an antenna 37 is wrapped and which is provided with a cylindrical recess and bore, respectively, 301. In said cylindrical recess and bore, respectively, 301 there is a light sensor (photo cell) 42 directly mounted in the scanning tip 23 and protected against damaging influences. From the light sensor (photo cell) an electric signal transmitting line 39 leads to a not shown write/read electronics in the not shown stylus 20.

According to FIG. 8, a ferrite core 30 around which an antenna 37 is wrapped can furthermore be embedded in a hardened and sealing compound 40 which at least fills the tip range 22. This sealing compound 40 is transmissive for optical radiation 41 and not obstructive for magnetic fields. The sealing compound directs the light radiation 41 entering the tip range 22 after reflection at a coat 43 to a light sensor 42 arranged within the interior of the stylus 20, whereby the light sensor can be mounted together with the write/read electronics on a printed circuit board 58. The light-reflecting coat 43 is arranged between the not shown inner wall of the stylus and the sealing compound 40 and embraces this sealing compound in a manner that it covers in the direction of the stylus tip or scanning tip 23 only maximally 90% of the antenna 37 and thus a too strong an attenuation of the electromagnetic field emitted by it is avoided.

In FIG. 9 similar to FIG. 5 a light guide 361 is enclosed by an antenna 37. Thereby a short piece of light guide is concerned having a refractive index $n_1$ which is followed by a photo-cell 42. The piece of light guide 361, the antenna 37, and the photo-cell 42 are externally enclosed by a light conducting body 44 which can be made by casting and which has a refractive index $n_2$. With respect to the refractive indices the relation $n_1 < n_2$ is valid so that the light 41 directed in the light guide 361 may not exit from the light guide 361. The photo-cell 42 is connected to a not shown electronic circuit via a signal transmitting line 39.

In FIG. 10 there are shown a computer 45 with a screen 451 and a HF-detector 452, a touchscreen-sensitive and transponder reading stylus 46 having a tip 461 (scanning tip), and a connecting cable and a radio antenna 462, respectively, as well as a transponder 47. On the screen 451 there are provided switching fields 453 which emit or reflect modulated light. The screen 451 including the switching fields 453 are touched by the tip 461, whereby an already and repeatedly mentioned photo-detector or optical sensor element within the stylus 46 is adapted to detect the modulated light emitted by the switching fields 453.

In FIG. 11 there is shown a block diagram of a touchscreen-sensitive and transponder reading stylus 46. The computer 45 images on its screen, for example, three switching fields (function keys) 453 which after having been touched by the scanning tip 461 of the inventional stylus 46 with its integrated light sensor 42, will be detected and demodulated and then passed on to a controller 48 attached to the stylus 46. The controller performs a plausibility check and, at a successful transfer, stores the control information and the data information in an input and data storage 49 and, if required, initiates a data transfer via an RF-ID-emitter and modulator stage 50, as common use with transponder applications, or, if required a data transfer via a cable channel or radio channel. The signal emitted by the RF-ID-emitter and modulator stage 50 will be detected by a HF-receiver 452 (FIG. 10) which is provided at the computer 45, and will be processed as acknowledgement, for example, by opening a result window of the computer 45 or by a mere screen display on the screen 451.

In the meantime the stylus 46 can process according to its programming the instructions (control information) received in the input and data storage 49, that is, it can communicate the status of its operating state to an optional display 51 such as an LED, and in particular the RF-ID-functions transferred to it via the emitter and modulator stage 50, the light sensor 42, the demodulator 52 and an antenna coil 37 common with RF-ID-systems. To this end, the stylus 46 has to be moved within the communication range of a transponder 47.

The module RF-ID-detector and demodulator 57 comprises an arrangement of components which are adapted to detect the data emitted by the transponder 47 and the conversion thereof into signals comprehensible to the controller 48.

It is important in the scope of the invention, that the communication protocols and/or types of modulation, driven via the RF-ID-emitter and modulator stage 50, in the course of signal transfer to the transponder 47 and to the HF-receiver 452 at the computer 45 can be different so that a unique function of the transponder 47 and of the computer 45 is ensured. When the communication with the transponder 47 has been completed, that is, when the instruction or the instruction set (a plurality of commands which have to be serially processed), buffered in the input storage und data storage 49, has been successfully processed or there was a timeout or there were communication problems, the stylus 46 controlled by the controller 48 transmits the data of an output storage 53 and diverse status information about the RF-ID-emitter and modulator stage 50 to the HF-receiver 452 or, via a radio channel 55 or via a cable channel 56 to the computer 45. A feedback to the computer 45 can also be carried out via the identical or parametrizable arrangement 50, 37 which is required for the transponder communication. Thus, the use of a separate radio channel and cable channel, respectively, becomes superfluous. The transmission can also be carried out by aid of harmonic waves.

The resulting data from the transponder communication are buffered in the output storage 53.

All further processes are then controlled by the computer 45 as generally known for RF-ID-systems. The output data, for example, from the storage 53 based on the transponder data are indicated and new menu windows are opened on the screen 451 of the computer. These menu windows, in turn, can comprise switching field as described above.

In the case of an incorrect transponder communication or of transmission errors between the RF-ID-emitter and modulator stage 50 and the HF-receiver 452, error messages are made on the computer screen 451 and respective changes of the program control are triggered.

When an instruction set has been processed in the stylus 46, the stylus will be switched to an economy mode either automatically, or after a predetermined time or actively by a special instruction code via a modulated switching field 453 and the light sensor 42. Consequently, all functions of the stylus 46 are turned-OFF except a Power-On-Reset-(POR)-input 54 of the controller 48 and the light sensor 42. In this mode, the light sensor 42 can work without an internal energy supply and it is set in such a manner that its threshold value will only be switched (mostly to logic H), when activated by light effect of the switching fields 453 upon the output (POR). In this way the controller 48 is activated (POR) and turns-ON the entire functions, in particular the active part of the light sensor 42 and the demodulator 52.

All of the essential units and processes mentioned hereinbefore are represented summarized in FIG. 12. Thereby a logically predetermined operational sequence is followed, starting with a defined screen display on the computer screen 451 in the form of function keys (switching fields) 453, followed by activating the stylus 46 by the stylus touching the keys 453. Particularly while touching the key, a transfer of control information and/or data to the stylus 46 can take place. The contact between the stylus 46 and the screen 451 results in switching-ON and activating, respectively, the energy consuming electronics of the stylus. In order to have a control function for this operation, an acknowledgement can be given to the HF-receiver 452 of the computer 45 by aid of the LED 51 or by a signal emitted via one of the radio channels 55 or 50, 37, respectively, via the cable channel 56. By activating the stylus 46 the communication to the transponder 47 is switched-ON. As a result of this communication with the transponder 47, the stylus 46 provides feedback information via the mentioned radio systems or cable connections. The LED may also be used for acknowledgement information.

The signals received by the computer 45 are displayed as results on the screen and can in special cases result in the formation of new key fields. Thus, the detection cycle can be started again or finished. The deactivation of the stylus 46 will take place advantageously automatically after an appropriate period of time. Provided that internal operations in the detection cycle are not finished correctly, error messages will be sent to the computer 45 via one of the radio channels or via the cable which also leads to a deactivation of the stylus 46.

The features disclosed in the specification, in the subsequent claims, and in the drawing are substantial for the invention both, individually and in any combination with one another.

LIST OF REFERENCE NUMERALS 20,46 touchscreen-sensitive and transponder reading stylus
21 hand-piece
22 tip range
23 scanning tip
24 specially shaped range
25,29,37 antenna/coil
26 write/read electronics
27 coil wires
28 additional components
30 ferromagnetic core/ferrite core
31 U-shaped core
32 rounded edge
33 proper scanning tip
34 pot-core
35 slanting area
36,361 light guide/light conducting cable
38 electrical connections
39 electric signal transmitting line
40 sealing compound
41 light radiation
42 light sensor/photo cell
43 coat
44 light conducting body
45 computer
47 transponder
48 controller
49 input and data storage
50 emitter and modulator stage
51 optional display
52 demodulator
53 output storage
54 power-on-reset input
55 radio channel/radio system
56 cable channel
37 RF-ID-communication detector 58 printed circuit board
301 recess/bore
311 core range
451 screen
452 HF-receiver
453 switching fields (function keys)
461 scanning tip 461
462 connecting cable/radio antenna
X-X axis

The invention claimed is:

1. A touchscreen-sensitive and transponder reading stylus for scanning screens, comprising:
 a handpiece including write/read electronics and RF-ID electronics;
 a tapered scanning tip zone extending from a bottom portion of said handpiece, the taper defining a bottommost tip end portion of said tip zone that is axially aligned with an outer radial surface of said stylus;
 an antenna disposed within said tip and disposed proximate to said end portion of said tip, said tip adapted for emitting an electromagnetic field generated from said antenna, and said antenna being in electronic communication with said write/read electronics in said handpiece, wherein the antenna comprises an electric coil; and
 a hardened sealing compound which causes no more than low electromagnetic attenuation, the hardened sealing compound fixing the antenna in the tip zone.

2. Touchscreen-sensitive and transponder reading stylus according to claim 1, further comprising a ferromagnetic core associated with the electric coil for focusing electromagnetic radiation from the electromagnetic field.

3. Touchscreen-sensitive and transponder reading stylus according to claim 2, wherein the ferromagnetic core is rod-shaped, the coil is wrapped therearound, the tip zone tapers symmetrically toward a center of the scanning tip and the scanning tip is rounded.

4. Touchscreen-sensitive and transponder reading stylus according to claim 2, wherein the ferromagnetic core is U-shaped, having two legs and a bridge connecting the legs, the coil is wrapped around the bridge, the tip zone comprises two conically converging substantially planar faces and the tapered end is slanted.

5. Touchscreen-sensitive and transponder reading stylus according to claim 2, wherein the ferromagnetic core comprises a pot core and the coil is received therein, and the tip zone includes a second taper that tapers eccentrically and is slanted.

6. Touchscreen-sensitive and transponder reading stylus according to claim 4 or 5, wherein the slanted tapered end is bounded by a closed curve which in an area of its smallest radius of curvature is of rounded appearance.

7. Touchscreen-sensitive and transponder reading stylus according to claim 2, further comprising a light sensor in the tip zone, the light sensor being within the ferromagnetic core.

8. Touchscreen-sensitive and transponder reading stylus according to claim 1, wherein a touch face formed by the scanning tip adapted for use as a touchscreen-sensitive stylus is of area smaller than 1 mm$^2$.

9. Touchscreen-sensitive and transponder reading stylus according to claim 1, further comprising a light sensor within the handpiece.

10. Touchscreen-sensitive and transponder reading stylus according to claim 9, further comprising a light conductor, the light conductor passing from the tapered end through the coil to the light sensor.

11. Touchscreen-sensitive and transponder reading stylus according to claim 10, wherein the light conductor passes through the ferromagnetic core.

12. Touchscreen-sensitive and transponder reading stylus according to claim 9, wherein the light sensor is at the scanning tip.

13. Touchscreen-sensitive and transponder reading stylus according to claim 9, further comprising an electronic circuit which includes the light sensor and further comprises a controller for signal connection and control, a power-on-rest-input for the controller, a demodulator connecting the controller to the light sensor, an input buffer, and output buffer, and an RF-ID emitter and modulator stage.

14. A combination of a touchscreen-sensitive and transponder reading stylus according to claim 9, and a transponder and a computer with which the stylus interacts, the computer comprising a screen having touch fields emitting light signals which activate the stylus.

15. Touchscreen-sensitive and transponder reading stylus according to claim 1, further comprising a stylus housing and wherein the sealing compound is light conducting and has a reflecting layer at an interface with the stylus housing, the stylus further comprising a light circuit board and a light sensor-disposed on the circuit board, the reflecting layer directing light entering at the scanning tip to the light sensor.

16. Touchscreen-sensitive and transponder reading stylus according to claim 1, further comprising an emitter and modulator stage for transponder communication, the emitter and modulator stage and the antenna coil being adapted to send signals to a computer.

* * * * *